United States Patent
Ogura et al.

(10) Patent No.: US 8,015,402 B2
(45) Date of Patent: Sep. 6, 2011

(54) ADDRESS-AUTHENTIFICATION-INFORMATION ISSUING APPARATUS, ADDRESS-AUTHENTIFICATION-INFORMATION ADDING APPARATUS, FALSE-ADDRESS CHECKING APPARATUS, AND NETWORK SYSTEM

(75) Inventors: Takao Ogura, Kanagawa (JP); Takeshi Ohnishi, Fukuoka (JP); Kenichi Fukuda, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 971 days.

(21) Appl. No.: 11/866,456

(22) Filed: Oct. 3, 2007

(65) Prior Publication Data

US 2008/0155657 A1 Jun. 26, 2008

(30) Foreign Application Priority Data

Dec. 20, 2006 (JP) .................................. 2006-342644

(51) Int. Cl.
*H04L 29/06* (2006.01)
(52) U.S. Cl. .............................. 713/161; 713/153; 726/3
(58) Field of Classification Search .................... 713/161
See application file for complete search history.

(56) References Cited

U.S. PATENT DOCUMENTS

| | | | |
|---|---|---|---|
| 7,783,756 B2* | 8/2010 | Choyi et al. | 709/225 |
| 2003/0200437 A1 | 10/2003 | Oishi | |
| 2006/0028996 A1* | 2/2006 | Huegen et al. | 370/252 |
| 2006/0114863 A1* | 6/2006 | Sanzgiri et al. | 370/338 |
| 2006/0184690 A1* | 8/2006 | Milliken | 709/238 |

FOREIGN PATENT DOCUMENTS

| | | |
|---|---|---|
| EP | 1075123 | 2/2001 |
| JP | 11-205388 | 7/1999 |
| JP | 2001103574 | 4/2001 |
| JP | 2003-242116 | 8/2003 |
| JP | 2004007512 | 1/2004 |

OTHER PUBLICATIONS

Office Action dated Apr. 21, 2009, for corresponding Japanese Patent Application 2006-342644.

* cited by examiner

*Primary Examiner* — Matthew Smithers
(74) *Attorney, Agent, or Firm* — Katten Muchin Rosenman LLP

(57) ABSTRACT

A DHCP/authentication server transmits an IP address and authentication information acquired from the IP address to a home gateway. The home gateway creates authentication data from the authentication information and adds the authentication data to an IP packet received from a terminal, and transfers the IP packet to a false-address checking server. The false-address checking server extracts a source IP address and the authentication data from the IP packet, and creates provisional authentication data based on the source IP address. The false-address checking server checks the provisional authentication data against the original authentication data. If these two pieces of the authentication data coincide with each other, the false-address checking server transfers the IP packet to a communication counter part. If the authentication data do not coincide with each other, the false-address checking server discards the IP packet.

18 Claims, 13 Drawing Sheets

ADDRESS-AUTHENTIFICATION-INFORMATION ISSUING APPARATUS, ADDRESS-AUTHENTIFICATION-INFORMATION ADDING APPARATUS, FALSE-ADDRESS CHECKING APPARATUS, AND NETWORK SYSTEM

CROSS-REFERENCE TO RELATED APPLICATIONS

This application is based upon and claims the benefit of priority from the prior Japanese Patent Application No. 2006-342644, filed on Dec. 20, 2006, the entire contents of which are incorporated herein by reference.

BACKGROUND OF THE INVENTION

1. Field of the Invention

The present invention relates to a technology for authentication of a source address in a network.

2. Description of the Related Art

Recently, malignant software, viruses, worms, and the like are often sent using a false source address from a malicious user to execute a denial of service (DoS) attack or a distributed DoS attack. Therefore, to eliminate such threats, it is important detect a packet for which a false source address is used. Moreover, it is important to prevent such a packet from flowing into a network.

Conventionally, routers and firewalls detect a false source address by filtering based on regular rules such as a rule in which the transfer of a packet whose source address and destination address are the same is not allowed. In addition, routers have a unicast reverse path forwarding (uRPF) function in which a source address is checked against a routing table and a packet from a source address that is not registered in the routing table is discarded.

Furthermore, as a conventional technique to strictly prevent a false source address, there is an authentication header (AH) mode communication in security architecture for Internet protocol (IPsec). Moreover, a proposal to prevent spoofing by a false source address has been publicly known. In this proposal, a host determines an Internet protocol version 6 (IPv6) address by communicating with a gateway or a dynamic host configuration protocol (DHCP) server, receives a public key certificate from the gateway or the DHCP server, and sends the public key certificate including the IPv6 address to a communication counterpart (for example, Japanese Patent Laid-Open Publication No. 2004-7512).

However, in the conventional false-address detecting function using routers or firewalls described above, a false global address having no regularity cannot be prevented. Therefore, a false source address cannot certainly be detected. Moreover, to performed communication in the conventional AH mode of the IPsec, it is necessary to manage various kinds of information (IP address, user identification (ID), preshared key in Internet key exchange (IKE), etc.) for each user in a virtual private network (VPN) server. Since the amount of information to be managed and the amount of processing increase in proportion to the number of subscribers, it is not suitable for a large scale system.

SUMMARY OF THE INVENTION

It is an object of the present invention to at least solve the problems in the conventional technologies.

An address-authentication-information issuing apparatus according to one aspect of the present invention includes an address issuing unit that issues an address to be assigned to a user, in response to an address issuance request from the user; and an authentication-information issuing unit that issues authentication information that verifies the address.

An address-authentication-information adding apparatus according to another aspect of the present invention includes a receiving unit that receives an address to be assigned to a user and authentication information that verifies the address, from a network; a storage unit that stores the authentication information; an adding unit that adds the authentication information stored in the storage unit to data transmitted from the user; and a transmitting unit that transmits the data to which the authentication information is added, to the network.

An false-address checking apparatus according to still another aspect of the present invention includes a receiving unit that receives data transmitted from a user; an extracting unit that extracts a source address and first authentication information that verifies the source address, from the data; and a checking unit that creates second authentication information based on the source address, and that checks the second authentication information against the first authentication information.

A network system according to still another aspect of the present invention includes an address-authentication-information issuing apparatus that issues an address to be assigned to a user and first authentication information that verifies the address; an address-authentication-information adding apparatus that adds the address and the first authentication information to data that is transmitted from the user; and an false-address checking apparatus that receives the data from the address-authentication-information adding apparatus and that checks second authentication information against the first authentication information, the second authentication information created based on a source address extracted from the data.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention are explained in detail below with reference to the accompanying drawings.

Figure 1:
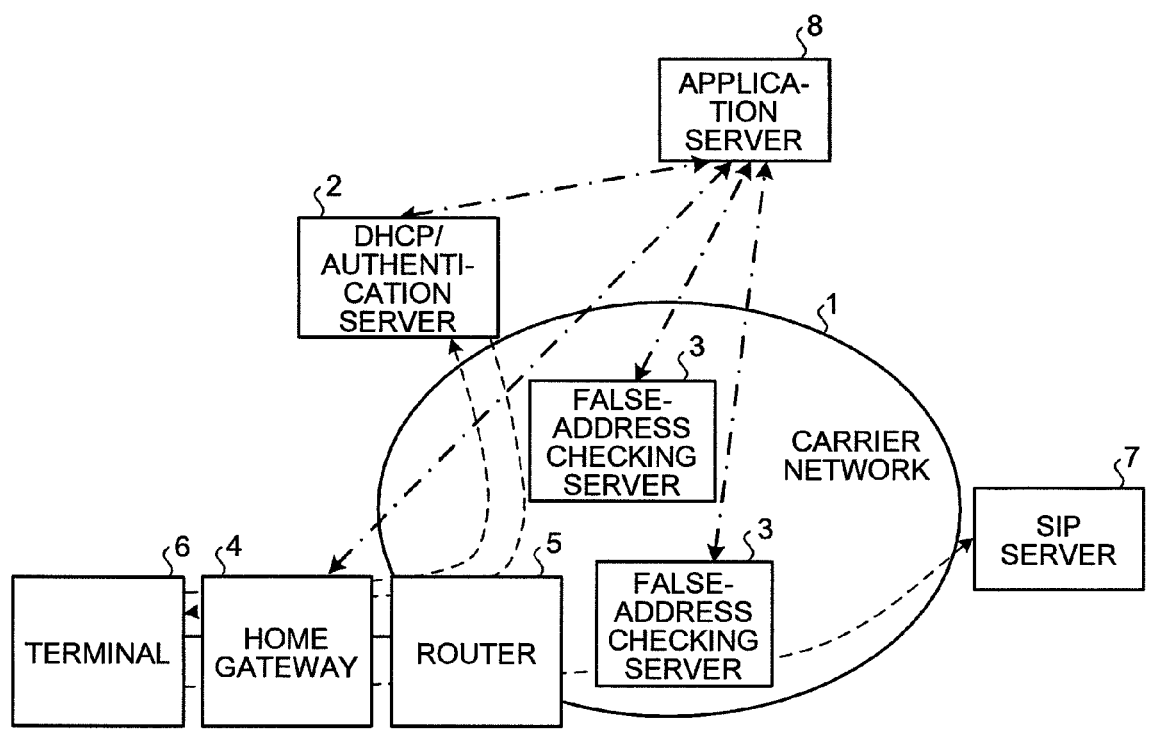
FIG. 1 is a block diagram of a network system according to an embodiment of the present invention.
Figure 2:
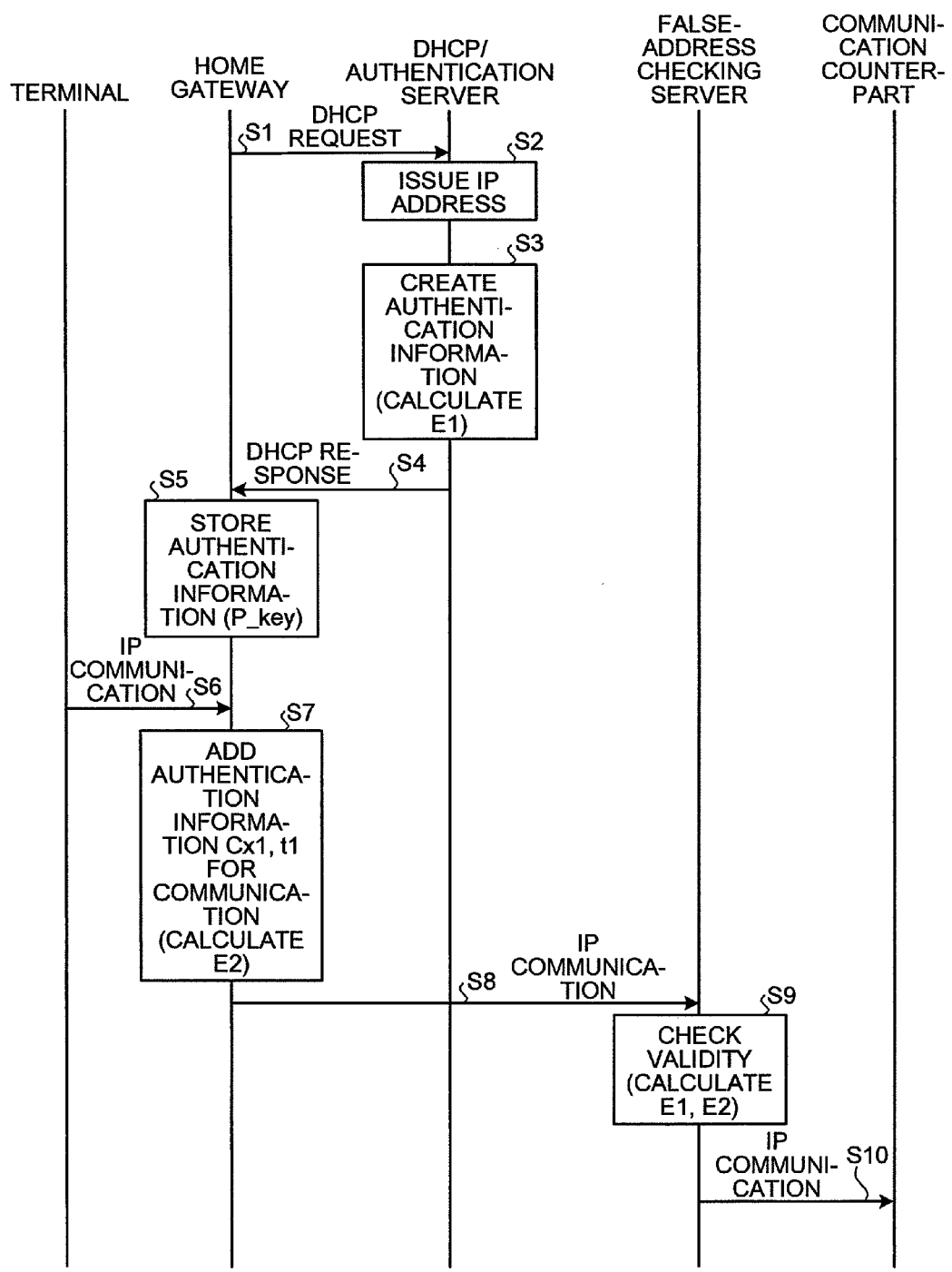
FIG. 2 is a sequence diagram of the network system.

FIG. 1 is a block diagram of a network system according to an embodiment of the present invention. FIG. 2 is a sequence diagram of the network system.

As shown in FIG. 1, in a carrier network 1, a DHCP/authentication server 2 and false-address checking servers 3 are provided. The DHCP/authentication server 2 serves as an address-authentication-information issuing apparatus, and the false-address checking server 3 functions as a false-address checking apparatus. A home gateway 4 that functions as an address-authentication-information adding apparatus is connected to a router 5 serving as a network gateway. A terminal 6 of a user is one terminal in a home network, and is connected to the home gateway 4.

As shown in FIG. 2, the home gateway 4 requests address issuance from the DHCP/authentication server 2 through the router 5 by sending a DHCP request at the time of connection to the network or at regular intervals (step S1). Upon receiving the DHCP request, the DHCP/authentication server 2 determines an IP address (IPx) to be assigned to the home gateway 4 from which the DHCP request is sent, and issues the IP address (step S2).

The DHCP/authentication server 2 calculates an encryption function E1 based on the issued IP address (IPx), to create authentication information (P_key) that verifies that the IP address is valid (step S3). The DHCP/authentication server 2 then sends the IP address (IPx) and the authentication information (P_key) to the home gateway 4 through the router 5 by sending a DHCP response (step S4).

The home gateway 4 makes a network setting based on the DHCP response received by the DHCP/authentication server 2. Moreover, the home gateway 4 extracts the authentication information (P_key) from the DHCP response, and stores the authentication information (P_key) (step S5). When the terminal 6 sends an IP packet by Internet protocol communication (IP communication) (step S6), the home gateway 4 receives the IP packet.

Thereafter, the home gateway 4 calculates an encryption function E2 based on the stored authentication information (P_key) and information of a current time (t1), to create authentication data (Cx1). The home gateway 4 adds the authentication data (Cx1) and information of the current time (t1) as authentication information for communication to the received IP packet (step S7), and transfers the IP packet through the router 5 by the IP communication (step S8).

One of the false-address checking servers 3 receives the IP packet sent from the home gateway 4. The false-address checking server 3 extracts the original authentication data (Cx1) and information concerning a source IP address (IPy) and the current time (t1), and compares the time (t1) and a current time (t2). If the difference between the compared times is beyond an allowable difference range, the false-address checking server 3 determines the case as a replay attack, and discards the received IP packet.

On the other hand, if the difference between the compared times is within the allowable difference range, based on the source IP address (IPy), the false-address checking server 3 calculates a function that is the same as the encryption function E1 calculated by the DHCP/authentication server 2, to create provisional authentication information (P_key2). Furthermore, based on the provisional authentication information (P_key2) and the time (t1) extracted from the received IP packet, the false-address checking server 3 calculates a function that is the same as the encryption function E2 calculated by the home gateway 4, to create provisional authentication data (Cx2).

The false-address checking server 3 then checks the provisional authentication data (Cx2) against the original authentication data (Cx1) (step S9). The original authentication data (Cx1) is data that is acquired from the IP address (IPx) issued by the DHCP/authentication server 2 to the home gateway 4. On the other hand, the provisional authentication data (Cx2) is data that is acquired from the source IP address (IPy) added to the IP packet transferred from the home gateway 4.

If these two pieces of data (Cx1, Cx2) coincide with each other, the source IP address of the received IP packet is not false, in other words, valid, and the false-address checking server 3 transfers the IP packet to a session initial protocol (SIP) server 7 (see FIG. 1), which is a communication counterpart, by the IP communication (step S10). On the other hand, if these two pieces of data (Cx1, Cx2) do not coincide with each other, the source IP address of the received IP packet is false, and the false-address checking server 3 discards the IP packet.

In the case where the authentication information (P_key) is not created at the time of issuance the IP address (IPx) by the DHCP/authentication server 2, the process at step S3 described above is omitted, and the DHCP/authentication server 2 sends the IP address (IPx) by sending the DHCP response to the home gateway 4 following step S2 (step S4). The home gateway 4 omits the processes at steps S5 and S7, and transfers the IP packet that is sent from the terminal 6 directly to the false-address checking server 3 (step S8).

The encryption function E1 calculated by the DHCP/authentication server 2, the encryption function E2 calculated by the home gateway 4, and the encryption functions E1 and E2 calculated by the false-address checking server 3 are, for example, functions in which a symmetric key is included in one of arguments. For example, a hash function such as cyclic redundancy check 32 (CRC32), message digest algorithm 5 (MD5), and secure hash algorithm-1 (SHA-1) can be used as the encryption function E1 or the encryption function E2. It is preferable to use such a function since the original data before encryption cannot be identified. In the specification, explanation is given assuming that MD5 is used for the hash function of the encryption functions E1 and E2.

As shown in FIG. 1, in the network system according to the embodiment, the encryption functions E1 and E2 can be changed by remote downloading from an application server 8. The symmetric key is regularly changed. Moreover, software in the DHCP/authentication server 2, the false-address checking server 3, and the home gateway 4 can also be upgraded by remote downloading from the application server 8.

Arrows indicated by dash-dotted lines in FIG. 1 express data flow by remote downloading of the encryption function E1, the encryption function E2, or software. Arrows indicated by broken lines in FIG. 1 express data flow (IP packet) between devices.

As described above, an accurate time is required by the home gateway 4 to cope with a replay attack. For this reason, the home gateway 4 obtains time information from a network time protocol (NTP) server (not shown) by NTP, and performs time adjustment.

In the network system, plural units of the false-address checking servers 3 are arranged. When the false-address checking server 3 that is in connection through the router 5 fails, the router 5 changes a connection destination of the home gateway 4 to the other false-address checking server 3. The same operation is performed when a load on the false-address checking server 3 in connection is heavy.

Figure 3:
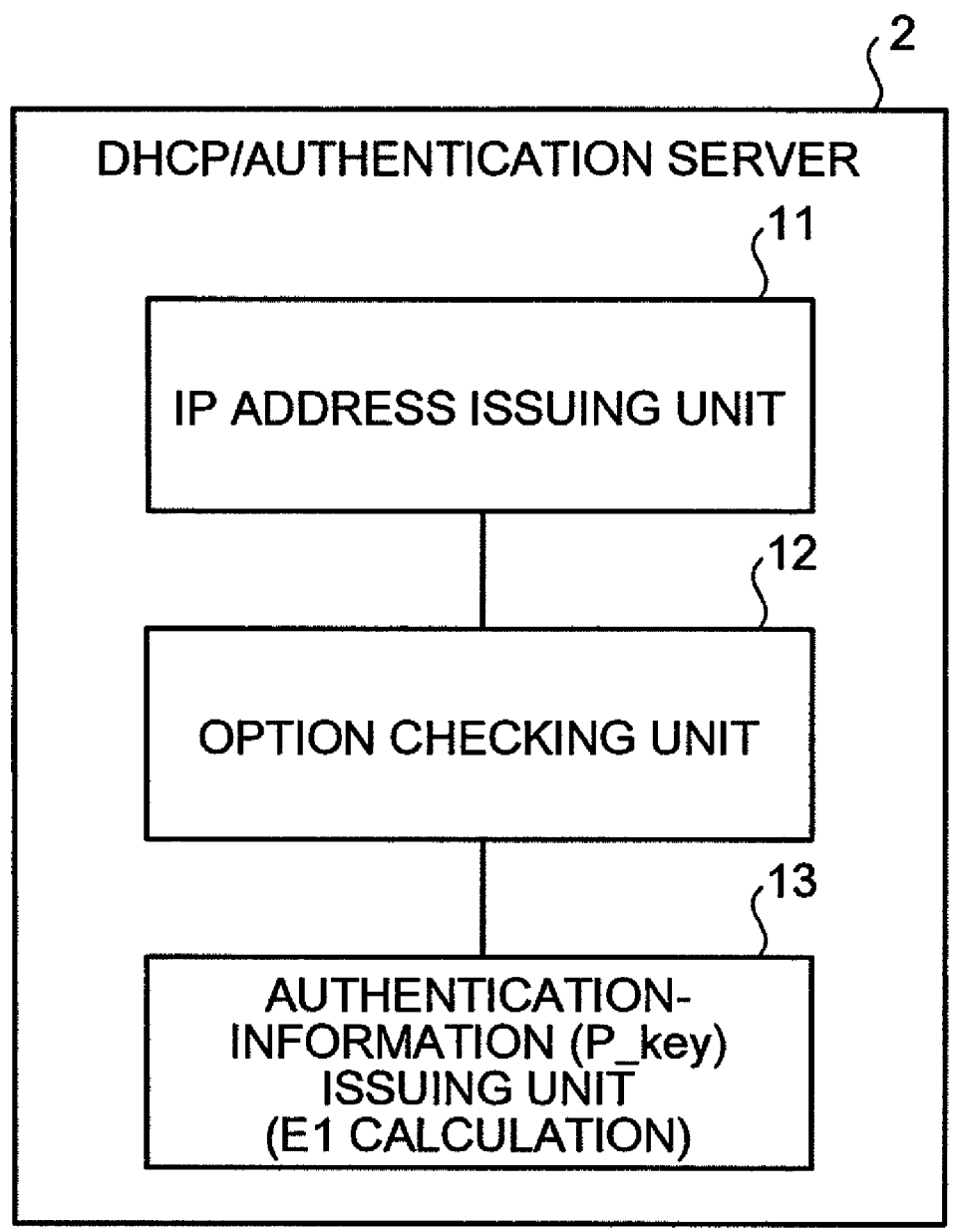
FIG. 3 is a block diagram of a DHCP/authentication server according to the embodiment.

FIG. 3 is a block diagram of the DHCP/authentication server according to the embodiment. As shown in FIG. 3, the DHCP/authentication server 2 includes an IP address issuing unit 11, an option checking unit 12, and an authentication-information issuing unit 13.

The IP address issuing unit 11 issues the IP address (IPx) to be assigned to the home gateway 4, in response to the DHCP request from the home gateway 4. The option checking unit 12 checks an option field in which a designated ID in the DHCP request is registered.

Figure 4:
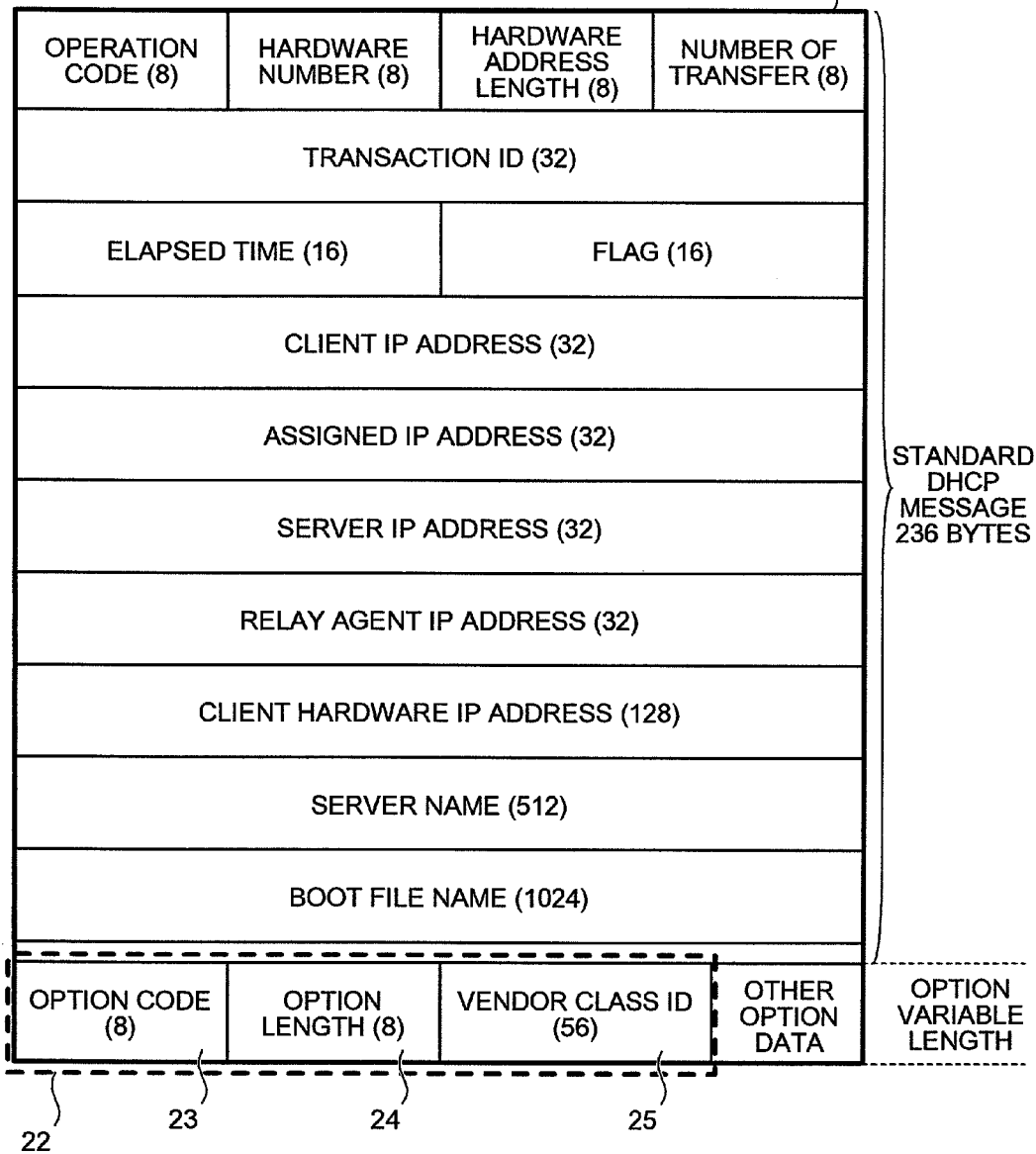
FIG. 4 is a schematic illustrating a packet format of a DHCP request in Internet protocol version 4 (IPv4)

FIG. 4 illustrates a packet format of the DHCP request when the Internet protocol version is 4 (IPv4). For example, in a packet format 21, an option field 22 is constituted of an option code 23, an option length 24, and a vendor class ID 25, and is used to store a vendor class ID. In this case, the option code is 60 (0x3C).

Figure 5:
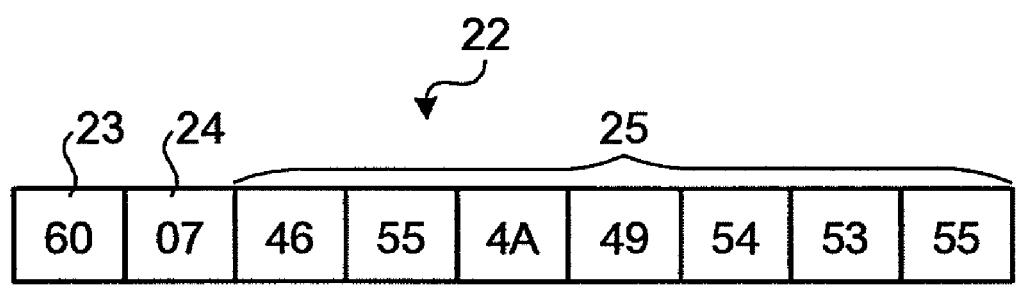
FIG. 5 is a schematic illustrating one example of data stored in an option field in the DHCP request in IPv4.

The option checking unit 12 checks the option code 23. FIG. 5 shows an example of data stored in the option field. In the example shown in FIG. 5, an option code 60 (0x3C) is stored in the option code 23, and an ID for Fujitsu Limited is stored in 7 bytes of the vendor class ID 25.

The authentication-information issuing unit 13 calculates the encryption function E1 based on the IP address (IPx) that is issued by the IP address issuing unit 11 and the symmetric key, to create the authentication information (P_key) that verifies the IP address (IPx). The authentication-information issuing unit 13 registers the authentication information (P_key) in the option field of the DHCP response.

Figure 6:
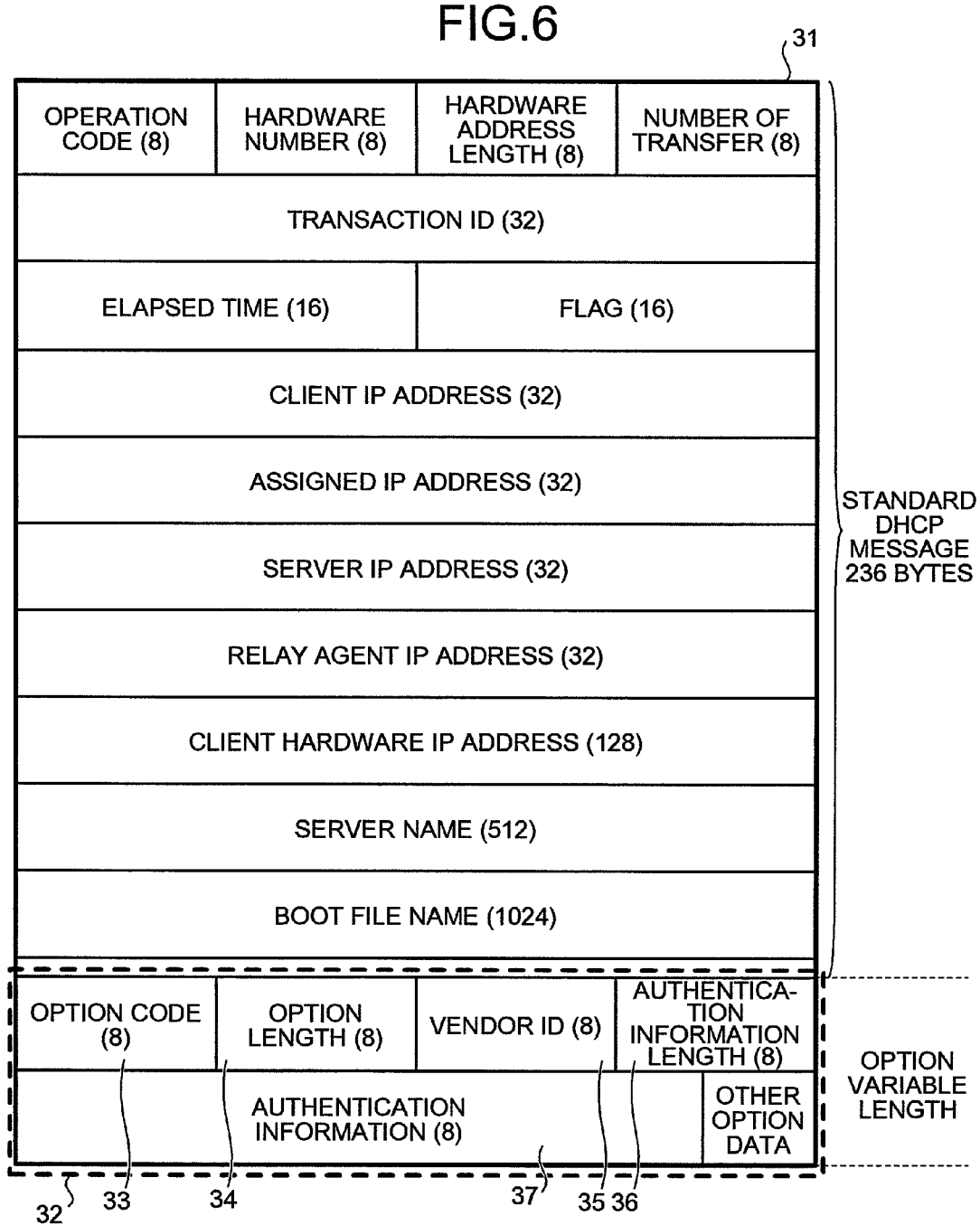
FIG. 6 is a schematic illustrating a packet format of a DHCP response in IPv4.

FIG. 6 illustrates a packet format of the DHCP response in IPv4. For example, in a packet format 31, an option field 32 is constituted of an option code 33, an option length 34, a vendor ID 35, an authentication information length 36, and authentication information 37, and is used to store vendor specific information. In this case, the option code is 43 (0x2B).

Figure 7:
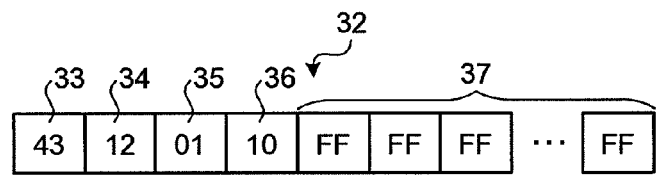
FIG. 7 is a schematic illustrating one example of data stored in an option field in the DHCP response in IPv4.

The authentication information (P_key) is registered using the authentication information length 36 and the authentication information 37. FIG. 7 shows one example of data stored in the option field 32. In the example shown in FIG. 7, the vendor ID 35 is 01, and the authentication information (P_key) is registered in 16 bytes of the authentication information 37.

Figure 8:
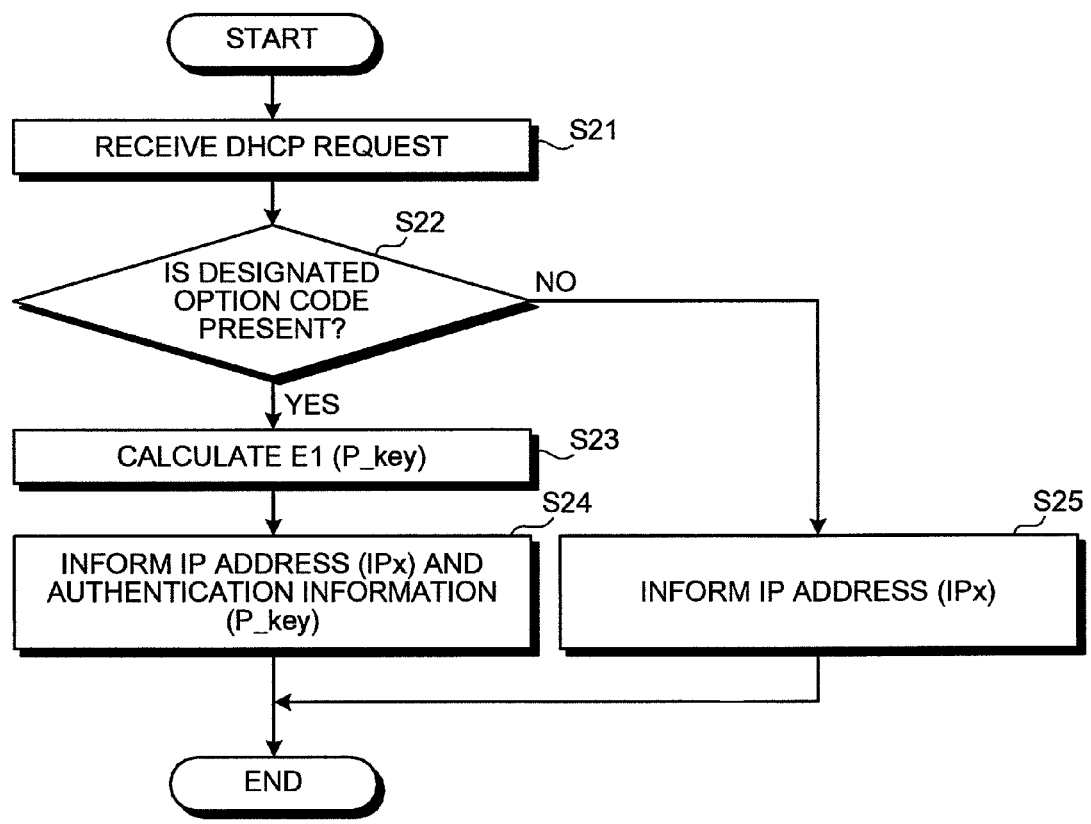
FIG. 8 is a flowchart of an address issuing process performed by the DHCP/authentication server according to the embodiment.

FIG. 8 is a flowchart of an address issuing process performed by the DHCP/authentication server. When the DHCP request is received from the home gateway 4 (step S21), the option checking unit 12 checks the option code 23 in the option field 22 of the IP header, and determines whether a designated option code is present therein (step S22). The designated option code herein is 60 (0x3C) indicating that the option field 22 is used to store the vendor class ID 25.

When the designated option code is present (step S22: YES), the authentication-information issuing unit 13 calculates the encryption function E1 based on the symmetric key and the IP address (IPx) that is issued by the IP address issuing unit 11, to acquire the authentication information (P_key) (step S23). The DHCP/authentication server 2 registers the authentication information (P_key) as the vendor specific information in the option field 32 of the IP header of the DHCP response.

The DHCP/authentication server 2 informs the home gateway 4 of the IP address (IPx) and the authentication information (P_key) by sending the DHCP response (step S24). Thus, the process is ended. On the other hand, when the designated option code is not present (step S22: NO), the DHCP/authentication server 2 informs the home gateway 4 of the IP address (IPx) by sending the DHCP response (step S25). Thus, the process is ended.

Figure 9:
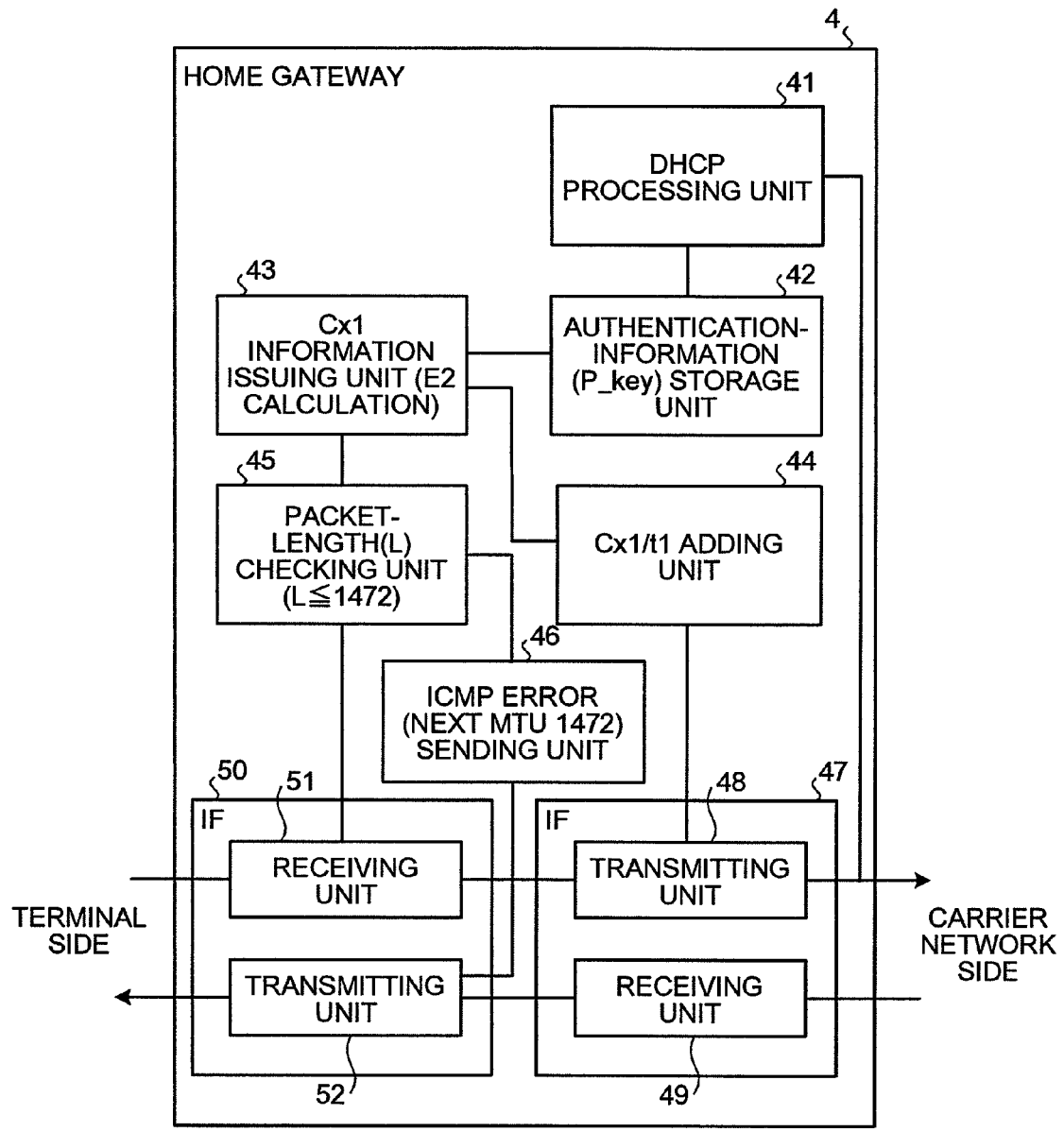
FIG. 9 is a block diagram of a home gateway according to the embodiment.

FIG. 9 is a block diagram of a configuration of the home gateway according to the embodiment. The home gateway 4 includes a DHCP processing unit 41, an authentication-information storage unit 42, a Cx1 information issuing unit 43, a Cx1/t1 adding unit 44, a packet-length checking unit 45, an internet-control-message-protocol (ICMP) error sending unit 46, a network-side interface 47 that is constituted of a transmitting unit 48 and a receiving unit 49, and a terminal-side interface 50 that is constituted of a transmitting unit 52 and a receiving unit 51.

The receiving unit 49 of the network-side interface 47 receives the DHCP response that is sent from the DHCP/authentication server 2. In the DHCP response, the IP address (IPx) that is assigned to the home gateway 4 by the DHCP/authentication server 2 is included, and the authentication information (P_key) of the IP address (IPx) can further be included. Therefore, the receiving unit 49 receives the IP address (IPx) and the authentication information (P_key).

The DHCP processing unit 41 sends the DHCP request to the DHCP/authentication server 2 at the time of connection to the network or at regular intervals. At this time, the DHCP processing unit 41 registers a designated vendor class ID in the option field of the DHCP request. Furthermore, the DHCP processing unit 41 extracts the IP address (IPx) and the authentication information (P_key) from the option storing the vendor specific information in the DHCP response.

Moreover, the DHCP processing unit 41 makes a network setting based on the DHCP response. The DHCP processing unit 41 further performs a network address translation (NAT) process on an IP address (global address) of the home gateway 4 on the carrier network side and an IP address (private address) of each of the terminals 6 on the home network side.

The authentication-information storage unit 42 stores the extracted authentication information (P_key) in a memory or the like. The Cx1 information issuing unit 43 encodes the authentication information (P_key) stored in the authentication-information storage unit 42. The Cx1 information issuing unit 43 calculates the encryption function E2 based on the authentication information (P_key) and the current time (t1), to create the authentication data (Cx1).

The Cx1/t1 adding unit 44 adds the authentication data (Cx1) and the time (t1) to an IP packet (data transmitted by a user) that is sent from the terminal 6. The Cx1/t1 adding unit 44 can be configured to add the authentication data (Cx1) and the time (t1) after the NAT process.

The transmitting unit 48 of the network-side interface 47 transmits the IP packet to which predetermined information is added by the Cx1/t1 adding unit 44, to the carrier network 1. Therefore, the transmitting unit 48 transmits data transmitted by a user to the carrier network 1.

Figure 10:
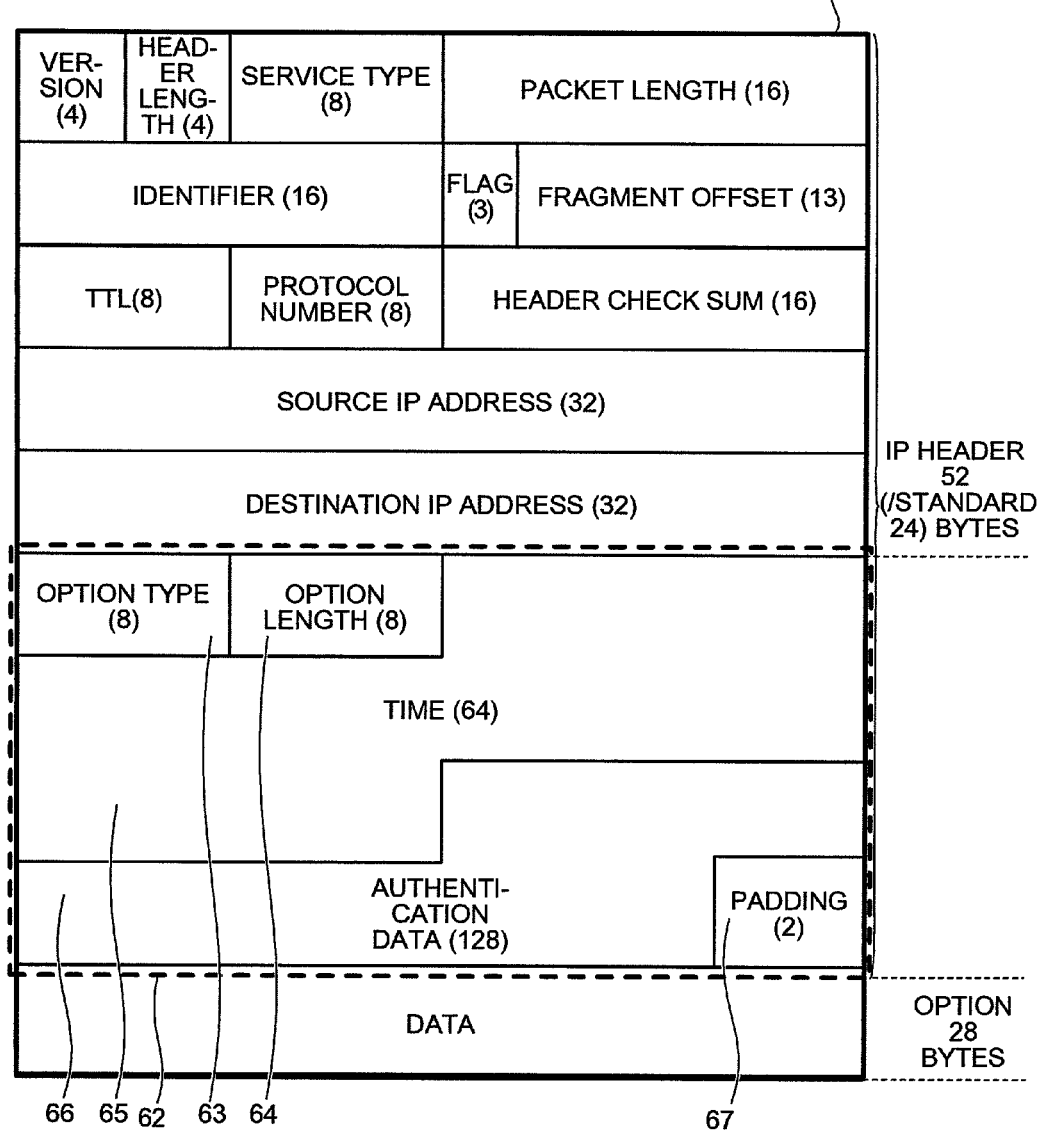
FIG. 10 is a schematic illustrating a format of an IP packet in IPv4.

FIG. 10 illustrates a format of an IP packet in IPv4. For example, in a packet format 61, an option field 62 of the IP header is constituted of an option type 63, an option length 64, a time 65, authentication data 66, and an option type (for padding) 67.

Figure 11:
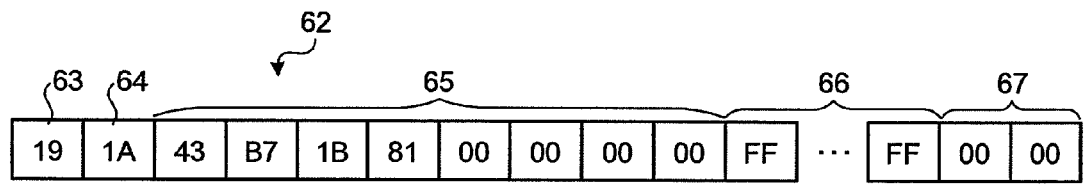
FIG. 11 is a schematic illustrating one example of data stored in an option field in the IP packet in IPv4.

The authentication data (Cx1) and the time (t1) are registered using the authentication data 66 and the time 65, respectively. FIG. 11 shows one example of data stored in the option field. In the example shown in FIG. 11, the option type is 25 (0x19) and the option length is 26 bytes.

The receiving unit 51 of the terminal-side interface 50 receives an IP packet that is sent from the terminal 6. The packet-length checking unit 45 checks whether packet length of the IP packet when the authentication data (Cx1) is added thereto is equal to or less than 1500 bytes (in the case of Ethernet). In the case of Ethernet, when the packet length of data transmitted to the carrier network 1 from the home gateway 4 exceeds 1500 bytes, packet fragmentation can occur.

To prevent the packet fragmentation, the terminal 6 transmits data to the home gateway 4 while setting 1 (don't fragment) in DF in the IP header. When the home gateway 4 receives such data, the home gateway 4 transmits an ICMP error (NEXT MTU=1472) to set a maximum transmission unit (MTU) to 1472 bytes by ICMP when the packet length comes close to exceeding 1500 bytes. This is because the option field of the IP packet in the example shown in FIG. 11 is 28 bytes.

The transmitting unit 52 of the terminal-side interface 50 transmits the ICMP error (NEXT MTU=1472) to the terminal 6. The terminal 6 that receives this ICMP error (NEXT MTU=1472) re-sends the data in 1472 bytes as a path MTU discovery process.

Figure 12:
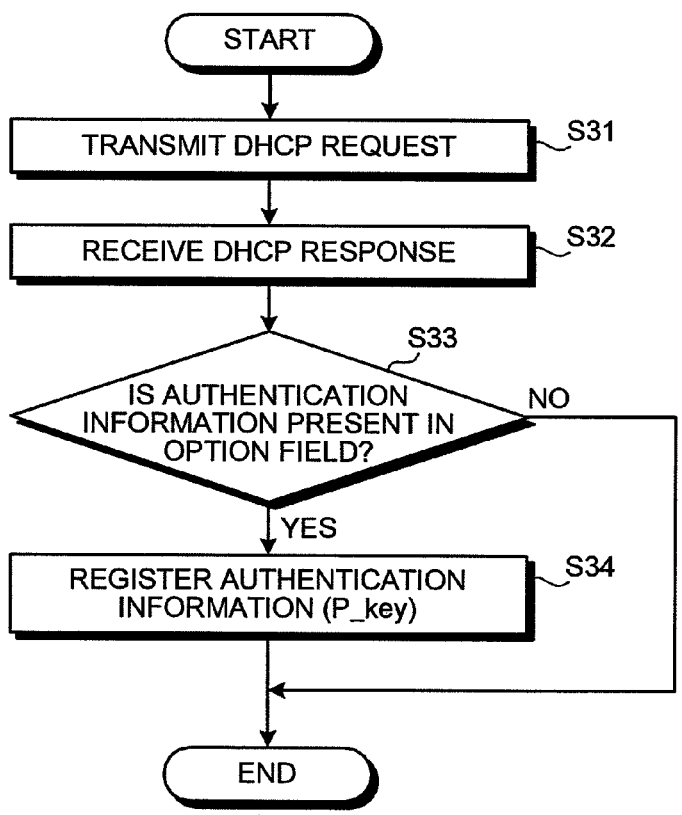
FIG. 12 is a flowchart of an authentication-information registering process performed by the home gateway according to the embodiment.

FIG. 12 is a flowchart of an authentication-information registering process performed by the home gateway. The DHCP processing unit 41 and the transmitting unit 48 of the network-side interface 47 register a designated vendor class ID in the option of the DHCP request, and transmit the DHCP request to the DHCP/authentication server 2 (step S31).

The receiving unit 49 of the network-side interface 47 and the DHCP processing unit 41 receive the DHCP response from the DHCP/authentication server 2 as a response to the DHCP request (step S32). The DHCP processing unit 41 makes a network setting and determines whether the authentication information is stored in the option field (vendor specific information) of the DHCP response (step S33).

When the authentication information is stored therein, (step S33: YES), the DHCP processing unit 41 extracts the authentication information. The authentication-information storage unit 42 stores the extracted authentication information (P_key) (step S34). Thus, the process is ended. On the other hand, when the authentication information is not stored (step S33: NO), the process is ended at this point.

Figure 13:
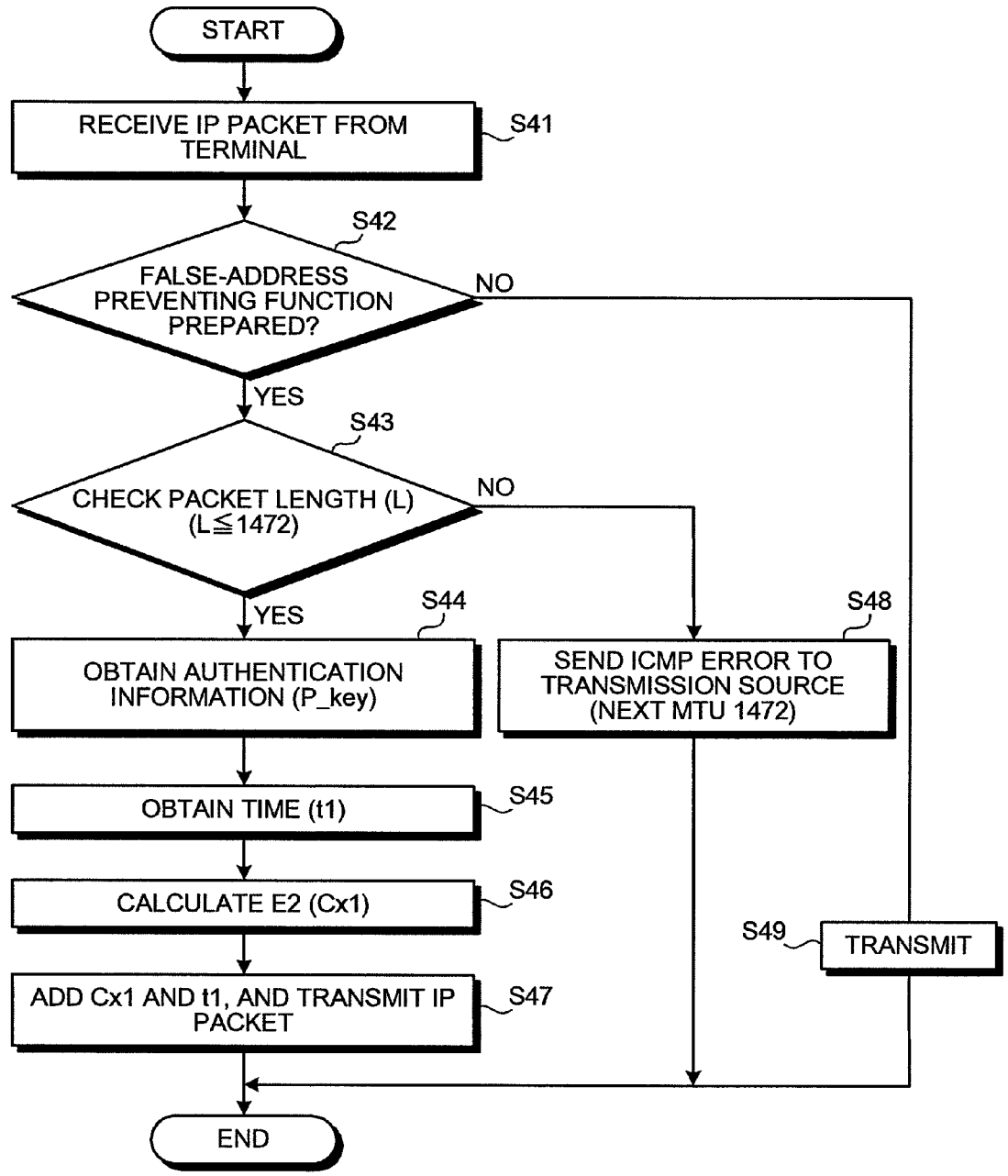
FIG. 13 is a flowchart of a data transfer process performed by the home gateway according to the embodiment.

FIG. 13 is a flowchart of a data transfer process performed by the home gateway. When the receiving unit 51 of the terminal-side interface 50 receives an IP packet from the terminal 6 (step S41), the home gateway 4 determines whether a false-address preventing function is prepared (step S42). When the false-address preventing function is prepared (step S42: YES), it is determined whether a packet length (L) of the received IP packet is, for example, equal to or less than 1472 bytes (step S43).

If the packet length (L) is equal to or less than 1472 bytes (step S43: YES), the Cx1 information issuing unit 43 obtains the authentication information (P_key) from the authentication-information storage unit 42 (step S44). Furthermore, the Cx1 information issuing unit 43 obtains information of the time (t1) from the carrier network 1 (step S45). The Cx1 information issuing unit 43 then calculates the encryption function E2 based on the authentication information (P_key) and the time (t1), to acquire the authentication data (Cx1) (step S46).

The Cx1/t1 adding unit 44 adds the authentication data (Cx1) and the information of the time (t1) to the IP packet to be sent from the receiving unit 51 of the terminal-side interface 50 to the transmitting unit 48 of the network-side interface 47. The transmitting unit 48 transmits the IP packet to the carrier network 1 (step S47).

If the packet length (L) of the received IP packet exceeds 1472 bytes (step S43: NO), the ICMP error sending unit 46 and the transmitting unit 52 of the terminal-side interface 50 send an ICMP error (NEXT MTU=1472) to a transmission source (step S48). Thus, the process is ended. If the false-address preventing function is not prepared (step S42: NO), the IP packet received from the terminal 6 is directly transmitted to the carrier network 1 (step S49). Thus, the process is ended.

Figure 14:
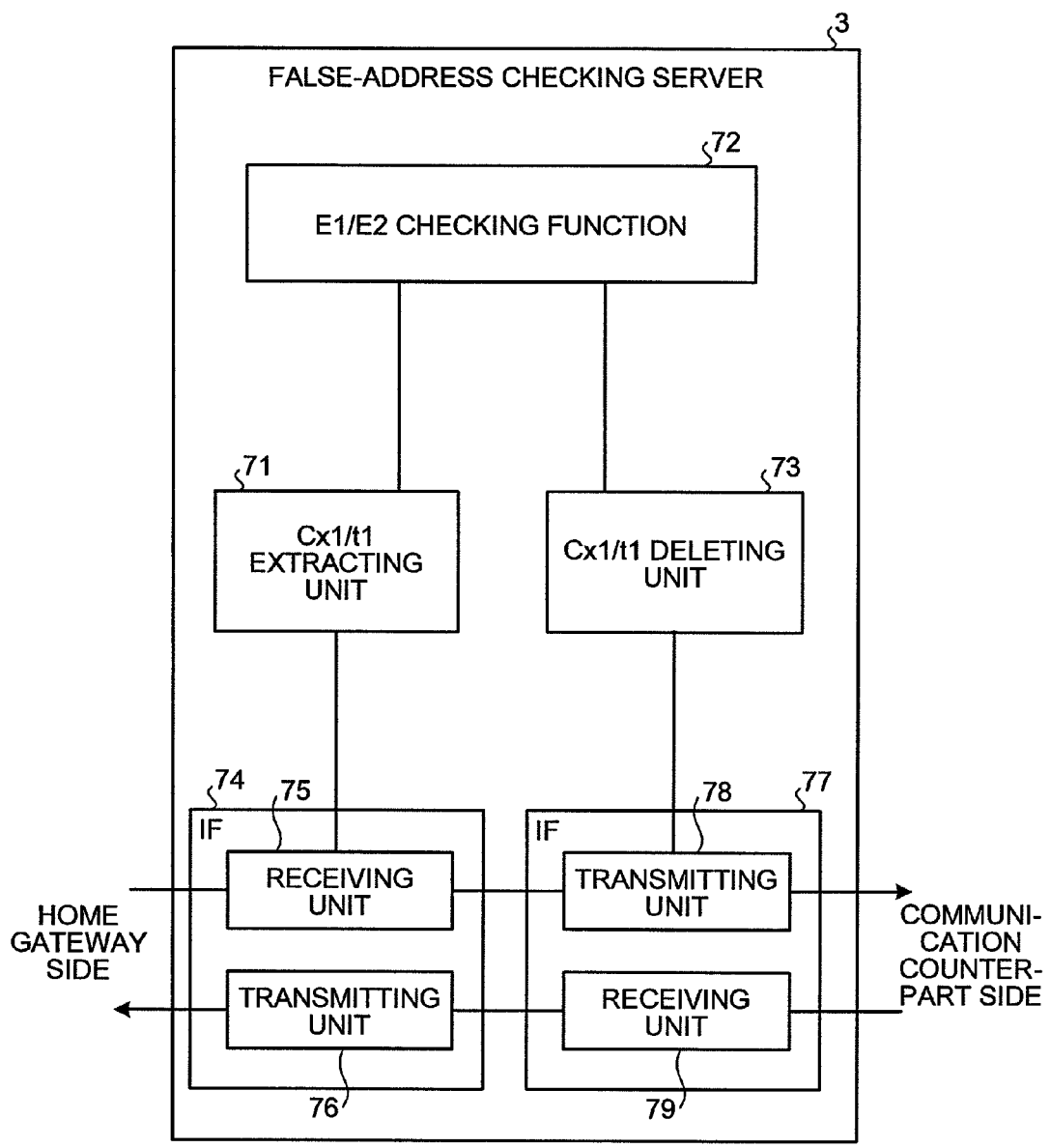
FIG. 14 is a block diagram of a false-address checking server according to the embodiment.

FIG. 14 is a block diagram of a configuration of the false-address checking server according to the embodiment. The false-address checking server 3 includes a Cx1/t1 extracting unit 71, an E1/E2 checking function 72, a Cx1/t1 deleting unit 73, a home-gateway-side interface 74 that is constituted of a transmitting unit 76 and a receiving unit 75, and a counterpart-side interface 77 that is constituted of a transmitting unit 78 and a receiving unit 79. The receiving unit 75 of the home-gateway-side interface 74 receives an IP packet that is transmitted from the home gateway 4.

The Cx1/t1 extracting unit 71 extracts the information of the source IP address (IPy) and the time (t1), and the authentication data (Cx1) from the IP header of the IP packet. The E1/E2 checking function 72 compares the time (t1) and the time (t2) at which the IP packet is received by the receiving unit 75.

If the difference (t2-t1) between the time (t1) and the time (t2) is within an allowable difference range (Δt), the E1/E2 checking function 72 determines that the IP packet is valid. If the difference (t2-t1) is beyond the allowable difference range (Δt), the E1/E2 checking function 72 determines that the IP packet is a replay attack, and discards the IP packet. The allowable difference range (Δt) can be determined by actually calculating the difference between the time (t1) and the time (t2), and by adding 500 milliseconds to the average of the calculated values.

The E1/E2 checking function 72 calculates the encryption function E1 based on the source IP address (IPy) extracted by the Cx1/t1 extracting unit 71 and the symmetric key, to create the provisional authentication information (P_key2). Furthermore, the E1/E2 checking function 72 calculates the encryption function E2 based on the provisional authentication information (P_key2) and the time (t1) extracted by the Cx1/t1 extracting unit 71, to create the provisional authentication data (Cx2).

The E1/E2 checking function 72 checks the provisional authentication data (Cx2) against the original authentication data (Cx1). When two pieces of the authentication data (Cx1, Cx2) do not coincide with each other, the E1/E2 checking function 72 determines that the source IP address (IPy) of the received IP packet is false, and discards the IP packet.

The Cx1/t1 deleting unit 73 deletes the original authentication data (Cx1) and the information of the time (t1) from the received IP packet when two pieces of the authentication data (Cx1, Cx2) coincide with each other. The transmitting unit 78 of the counterpart-side interface 77 transmits the IP packet from which the authentication data (Cx1) and the information of the time (t1) are deleted to a destination designated by the terminal 6.

Figure 15:
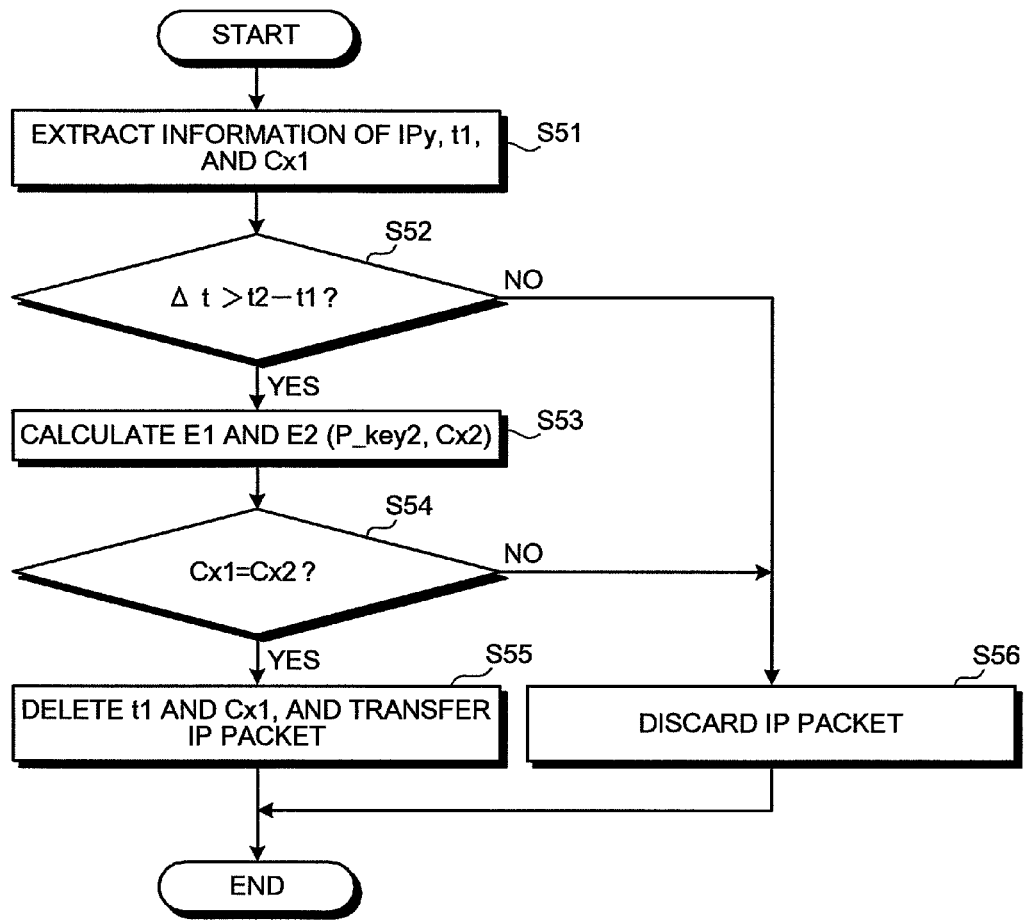
FIG. 15 is a flowchart of a false-address checking process performed by the false-address checking server according to the embodiment.

FIG. 15 is a flowchart of a false-address checking process performed by the false-address checking server. When the receiving unit 75 of the home-gateway-side interface 74 receives an IP packet from the home gateway 4, the Cx1/t1 extracting unit 71 extracts the information of the source IP address (IPy) and the time (t1), and the authentication data (Cx1) from the IP header of the IP packet (step S51).

The E1/E2 checking function 72 compares the time (t1) and the time (t2) at which the IP packet is received, and determines whether the difference (t2-t1) is within the allowable difference range (Δt) (step S52). When the difference (t2-t1) is within the allowable difference range (Δt) (step S52: YES), the E1/E2 checking function 72 calculates the encryption functions E1 and E2, and acquires the provisional authentication information (P_key2) and the provisional authentication data (Cx2) (step S53).

The E1/E2 checking function 72 determines whether the original authentication data (Cx1) and the provisional authentication data (Cx2) coincide with each other (step S54). When these two pieces of the authentication data (Cx1, Cx2) coincide with each other (step S54: YES), the Cx1/t1 deleting unit 73 deletes the original authentication data (Cx1) and the information of the time (t1) from the IP packet to be sent from the receiving unit 75 of the home-gateway-side interface 74 to the transmitting unit 78 of the counterpart-side interface 77.

The transmitting unit 78 transfers the IP packet from which the authentication data (Cx1) and the information of the time (t1) are deleted to a destination designated by the terminal 6 (step S55). Thus, the process is ended. On the other hand, when the difference (t2-t1) between the time (t1) and the time (t2) is beyond the allowable difference range (Δt) (step S53: NO), or when the two pieces of the authentication data (Cx1, Cx2) do not coincide with each other (step S54: NO), the received IP packet is discarded (step S56). Thus, the process is ended.

As described above, according to the embodiment, the provisional authentication data (Cx2) that is created by the false-address checking server 3 based on the source IP address of the received IP packet, is checked against the original authentication data (Cx1) that is issued by the DHCP/authentication server 2. If these two pieces of the authentication data (Cx1, Cx2) do not coincide with each other, it is determined that the source IP address is false. Therefore, it is possible to detect a false source IP address easily without managing user information. In addition, it is possible to prevent a packet whose source IP address is false from flowing into a network.

Figure 16:
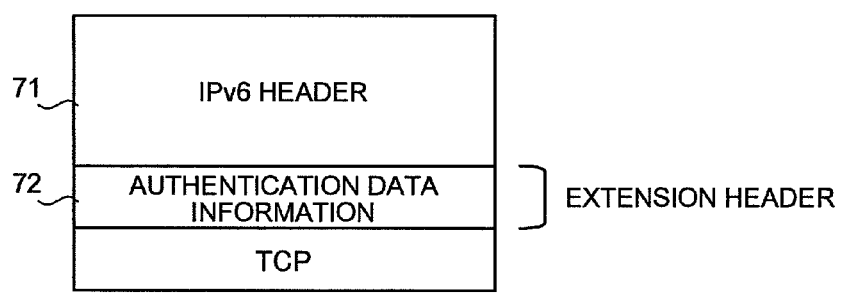
FIG. 16 is a schematic illustrating a configuration of an IP packet in IPv6.

The present invention is not limited to the above embodiment, and various modifications can be made. For example, when the Internet protocol version is 6 (IPv6), in a packet configuration shown in FIG. 16, a special code can be registered in a next header in an IPv6 header 71, and the authentication data can be stored in an extension header 72. Moreover, the authentication-information adding function that is provided in the home gateway 4 can be provided in the terminal 6. The function of the false-address checking server 3 can be provided in the router 5.

In the case where data transmitted from a user is a transmission control protocol (TCP)/IP packet, if it is configured to add the authentication data only to a synchronization (SYN) packet, the load can be decreased. In the case where a user uses a fixed IP address, it can be configured such that the IP address to be used at the network authentication is declared, and the authentication data of the declared IP address is added before transmission to the false-address checking server 3.

According to the embodiment described above, it is possible to detect a false source address easily without managing user information. Moreover, it is possible to prevent a packet whose source address is false from flowing into a network.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An address-authentication-information issuing apparatus comprising:
   an address issuing unit that issues an address to be assigned to a user, in response to an address issuance request from the user; and
   an authentication-information issuing unit that issues, based on an encryption function that includes a symmetric key and the address as parameters, authentication information that verifies the address.

2. The address-authentication-information issuing apparatus according to claim 1, wherein the authentication-information issuing unit issues the authentication information when the address issuance request includes a predetermined option.

3. The address-authentication-information issuing apparatus according to claim 1, wherein the authentication-information issuing unit issues the authentication information based on the address.

4. An address-authentication-information adding apparatus comprising:
   a receiving unit that receives an address to be assigned to a user and authentication information that verifies the address, from a network;
   a storage unit that stores the authentication information;
   an adding unit that adds the authentication information stored in the storage unit to data transmitted from the user;
   a transmitting unit that transmits the data to which the authentication information is added, to the network;
   a checking unit that checks length of the data; and
   an error sending unit that sends a message instructing to make the length of the data to predetermined length or less when it is found that the length of the data exceeds the predetermined length as a result of checking by the checking unit.

5. The address-authentication-information adding apparatus according to claim 4, further comprising an encoding unit that encodes the authentication information stored in the storage unit to output to the adding unit.

6. The address-authentication-information adding apparatus according to claim 5, wherein the encoding unit encodes the authentication information stored in the storage unit based on an encryption function that includes time information indicating time of encoding and the authentication information stored in the storage unit as parameters.

7. The address-authentication-information adding apparatus according to claim 6, wherein the adding unit further adds the time information to the data.

8. The address-authentication-information adding apparatus according to claim 4, wherein the address-authentication-information adding apparatus functions as a home gateway for a home network with least one user terminal.

9. A false-address checking apparatus comprising:
   a receiving unit that receives data transmitted from a user;
   an extracting unit that extracts a source address and first authentication information that verifies the source address, from the data; and a checking unit that creates second authentication information based on the source address, and that checks the second authentication information against the first authentication information.

10. The false-address checking apparatus according to claim 9, wherein the checking unit discards the data when the second authentication information does not coincide with the first authentication information.

11. The false-address checking apparatus according to claim 9, further comprising:
   a deleting unit that deletes the first authentication information from the data when it is found that the second authentication information coincides with the first authentication information as a result of checking by the checking unit; and
   a transmitting unit that transmits the data from which the first authentication information is deleted to a destination that is designated by the user.

12. The false-address checking apparatus according to claim 9, wherein
   the extracting unit includes a time extracting function that extracts first time information from the data, and
   the checking unit compares the first time information and second time information indicating time at which the data is received by the receiving unit, and discards the data when a difference between the first time information and the second time information is beyond an allowance range.

13. The false-address checking apparatus according to claim 9, wherein the checking unit creates the second authentication information based on an encryption function that includes a symmetric key and the source address as parameters.

14. A network system comprising:
   an address-authentication-information issuing apparatus that issues an address to be assigned to a user and first authentication information that verifies the address;
   an address-authentication-information adding apparatus that adds the address and the first authentication information to data that is transmitted from the user; and
   a false-address checking apparatus that receives the data from the address-authentication-information adding apparatus and that checks second authentication information against the first authentication information, the second authentication information created based on a source address extracted from the data.

15. The network system according to claim 14, wherein the false-address checking apparatus discards the data when the second authentication information does not coincide with the first authentication information.

16. The network system according to claim 14, wherein the false-address checking apparatus transfers the data to a destination designated by the user when the second authentication information coincides with the first authentication information.

17. The network system according to claim 14, wherein the false-address checking apparatus extracts first time information indicating time from the data, compares the first time information with second time information indicating time at which the data is received, and discards the data when a difference between the first time information and the second time information is beyond an allowable range.

18. The network system according to claim 14, wherein
   the address-authentication-information issuing apparatus creates the first authentication information based on an encryption information that includes the address and a symmetric key as parameters,
   the false-address checking apparatus creates the second authentication information based on an encryption function that is identical to the encryption function of the first authentication information and that includes the source address and a symmetric key as parameters.

* * * * *